United States Patent
Sanders et al.

(10) Patent No.: US 7,048,229 B2
(45) Date of Patent: May 23, 2006

(54) LOW SONIC BOOM INLET FOR SUPERSONIC AIRCRAFT

(75) Inventors: Bobby W. Sanders, Westlake, OH (US); Lois J. Weir, North Canton, OH (US)

(73) Assignee: Techland Research, Inc., North Olmstead, OH (US)

( * ) Notice: Subject to any disclaimer, the term of this patent is extended or adjusted under 35 U.S.C. 154(b) by 0 days.

(21) Appl. No.: 09/966,551

(22) Filed: Sep. 26, 2001

(65) Prior Publication Data

US 2002/0117581 A1 Aug. 29, 2002

Related U.S. Application Data

(60) Provisional application No. 60/235,359, filed on Sep. 26, 2000.

(51) Int. Cl.
*B64B 1/24* (2006.01)

(52) U.S. Cl. .................. 244/53 B; 137/15.1
(58) Field of Classification Search .............. 244/53 B, 244/53 R, 207; 60/269, 230, 226.1, 224; 131/15.1; 239/DIG. 7; 137/15.1

See application file for complete search history.

(56) References Cited

U.S. PATENT DOCUMENTS

| | | | | |
|---|---|---|---|---|
| 3,161,379 A | * | 12/1964 | Lane | |
| 3,265,331 A | * | 8/1966 | Miles | |
| 3,430,640 A | * | 3/1969 | Lennard | |
| 4,372,505 A | * | 2/1983 | Syberg | |
| 4,749,151 A | * | 6/1988 | Ball et al. | |
| 5,088,660 A | * | 2/1992 | Karanian | |
| 5,447,283 A | * | 9/1995 | Tindell | |
| 5,881,758 A | * | 3/1999 | Koncsek et al. | |
| 6,375,118 B1 | * | 4/2002 | Kibens et al. | |

FOREIGN PATENT DOCUMENTS

EP 358347 * 3/1990

* cited by examiner

*Primary Examiner*—Tien Dinh
(74) *Attorney, Agent, or Firm*—Calfee, Halter & Griswold LLP

(57) ABSTRACT

All-internal compression inlets for supersonic aircraft, with variable geometry systems and shock stability bleed systems provide high performance, large operability margins, i.e. terminal shock stability that reduces the probability of inlet unstart, and contribute little or nothing to the overall sonic boom signature of the aircraft. These inlets have very high internal area contraction or compression and very low external surface angles. All shocks from the internal inlet surfaces are captured and reflected inside the inlet duct, and all of the external nacelle surfaces are substantially aligned with the external airflow. The inlet shock stability system consists of bleed regions that duct bleed airflows to variable area exits with passive or active exit area controls. This reduces the risk of inlet unstarts by removing airflow through a large open throat bleed region to compensate for reductions in diffuser (engine) corrected airflow demand. Because the stability bleed is not removed until the inlet terminal shock moves upstream over the bleed region, the necessary normal shock operability margin is provided without compromising inlet performance (total pressure recovery, and distortion).

25 Claims, 14 Drawing Sheets

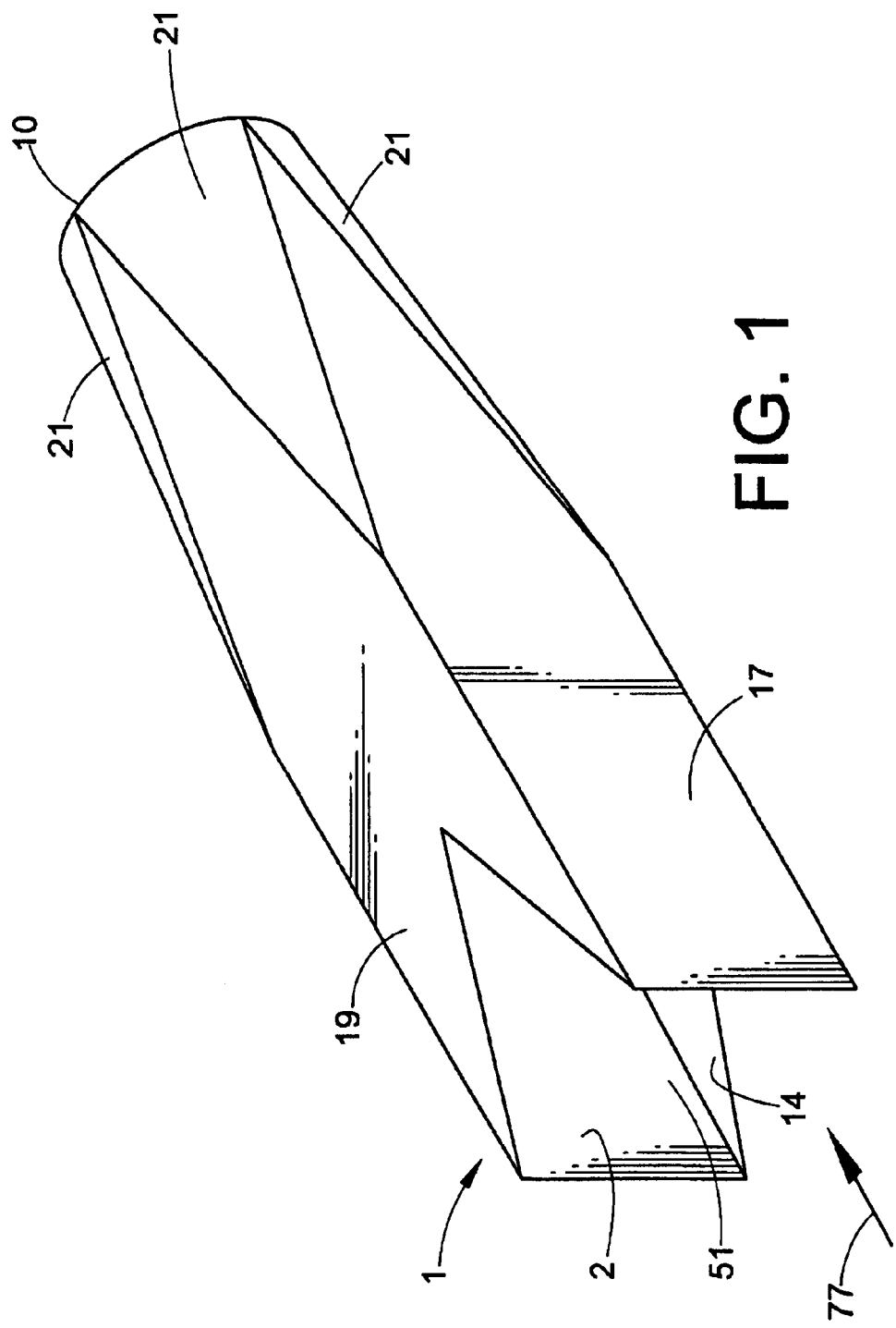

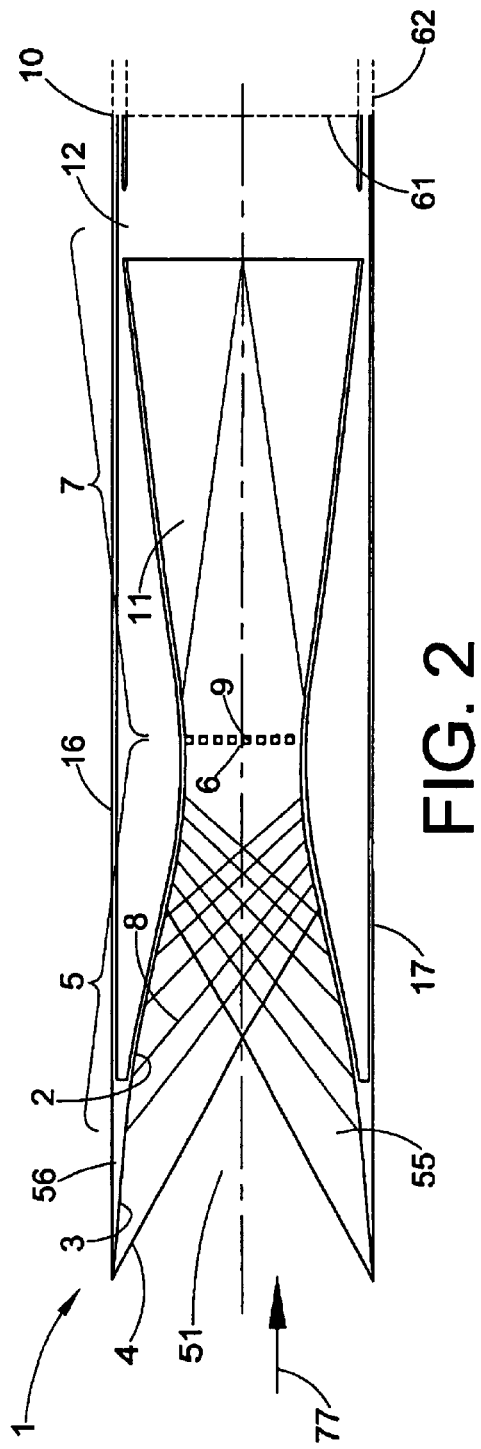
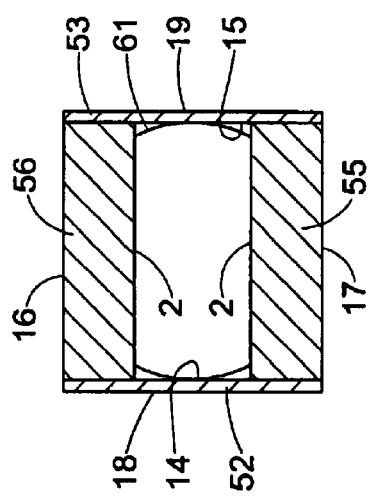

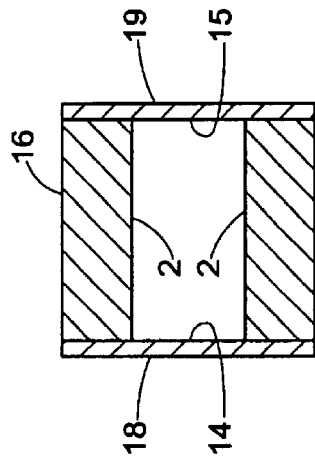
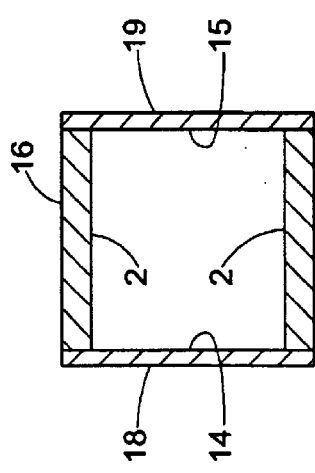
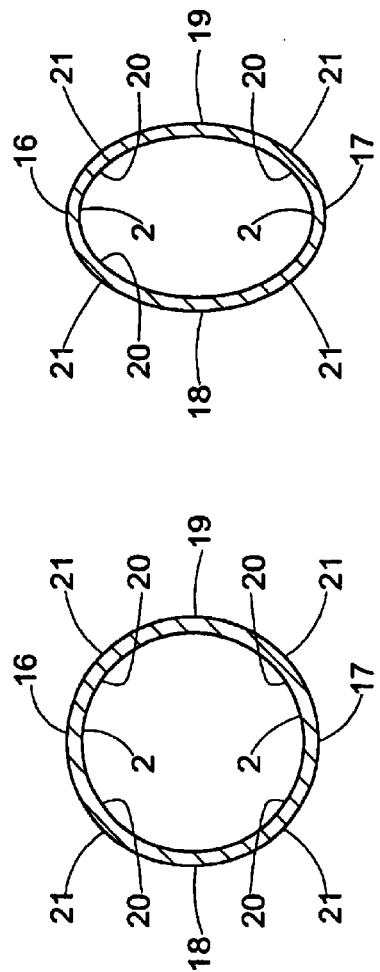
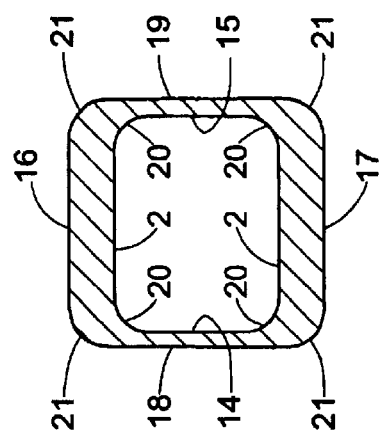

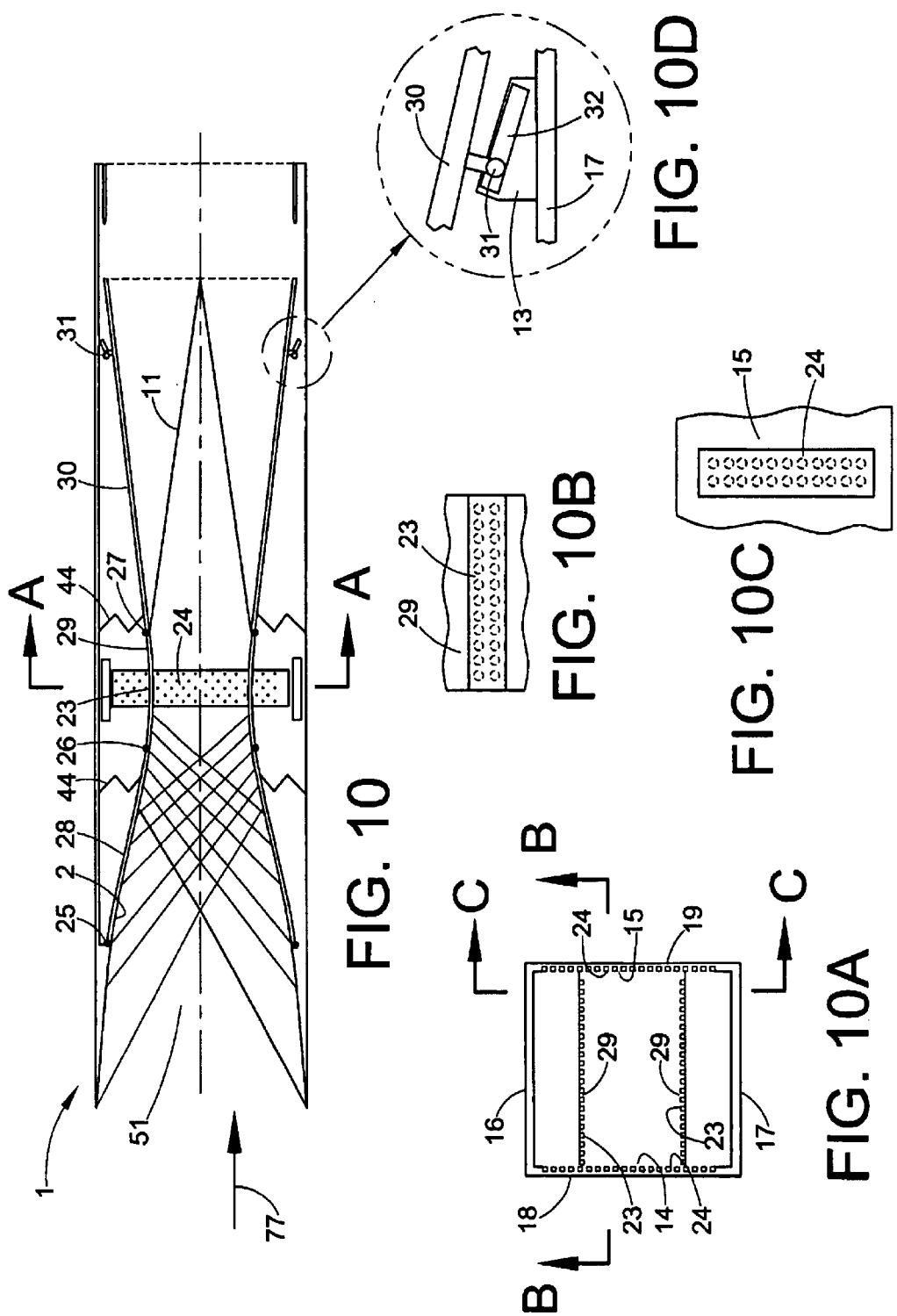

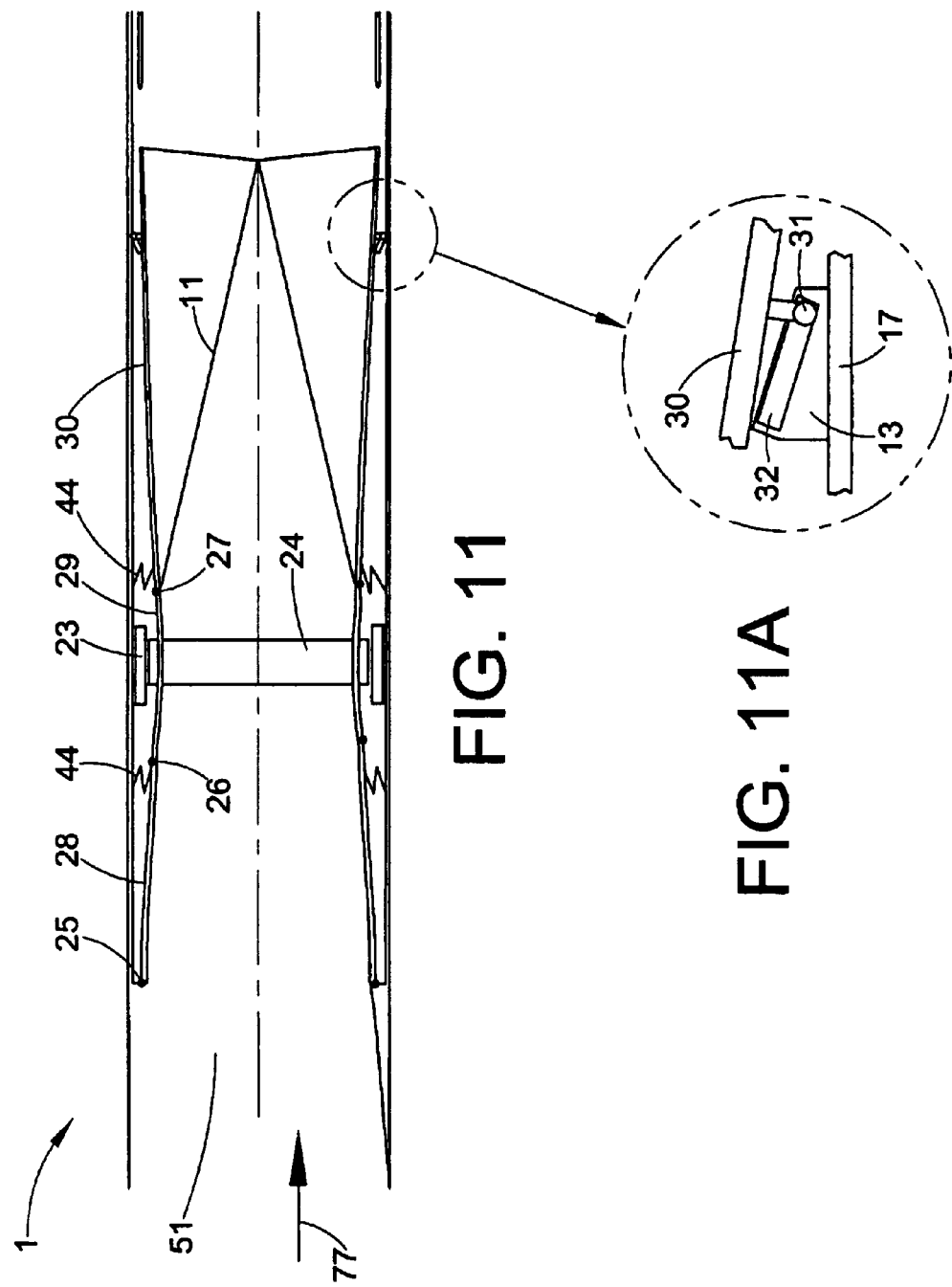

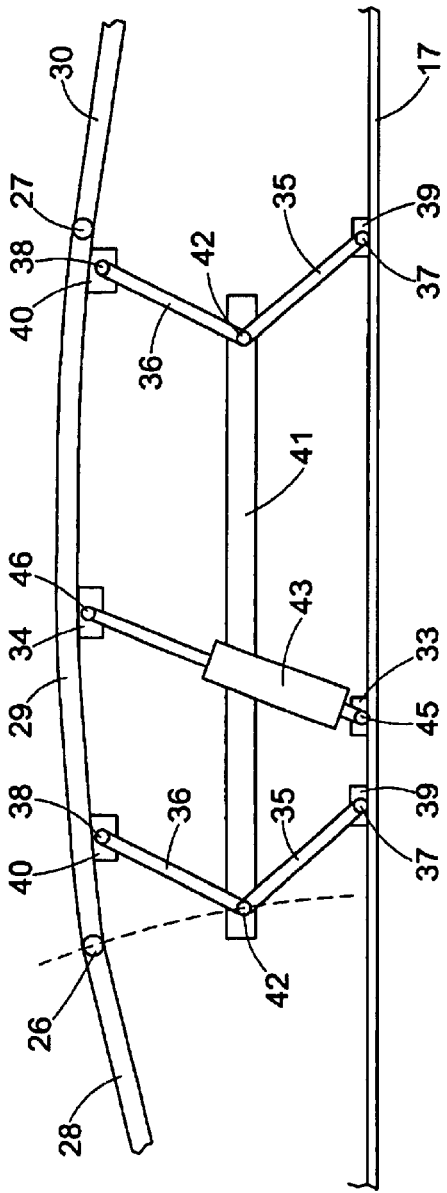
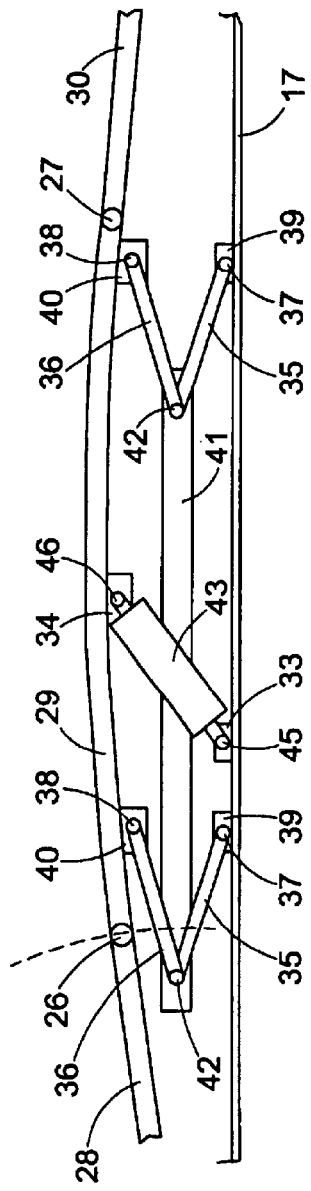
FIG. 12
FIG. 13

LOW SONIC BOOM INLET FOR SUPERSONIC AIRCRAFT

CROSS REFERENCE TO RELATED APPLICATIONS

This application claims the benefit of U.S. provisional application Ser. No. 60/235,359 filed on Sep. 26, 2000.

FIELD OF THE INVENTION

This invention relates to air intakes for flight vehicles and, more particularly, to air intakes for aircraft that are designed to fly at supersonic speeds.

BACKGROUND OF THE INVENTION

Inlets for propulsion systems for high speed supersonic aircraft are designed to efficiently decelerate the approaching high-speed airflow to velocities that are compatible with efficient airbreathing engine operation and to provide optimum matching of inlet airflow supply to engine airflow requirements. Entrance airflow velocities to existing airbreathing engines must be subsonic; therefore, it is necessary to decelerate the airflow speed during supersonic flight. The airflow velocities are slowed from supersonic speeds (above the speed of sound) to engine entrance Mach numbers that are subsonic (below the speed of sound).

In aircraft propulsion systems having supersonic inlets, it is essential that the inlet decelerate the airflow in a manner that minimizes the pressure losses, cowl and additive drag, and flow distortion at the engine entrance. For supersonic inlets, efficient deceleration of the supersonic velocities is accomplished by a series of weak shock waves and/or isentropic compression, in which the speed is progressively slowed to an inlet throat Mach number of about 1.30. A terminal shock wave located near the inlet throat slows the airflow from supersonic speeds (above the speed of sound) to subsonic speeds (below the speed of sound). This terminal shock wave typically changes a Mach 1.3 flow condition to a high subsonic flow level. Downstream of the terminal shock, the speed of the airflow is additionally slowed in the subsonic diffuser of the inlet by a smooth transitioning of the flow duct from a smaller throat area to the larger area at the engine entrance.

Mixed-compression inlets, in which some of the supersonic compression or deceleration in velocity is accomplished external to the duct and some of the compression is accomplished internally, have commonly been proposed for supersonic aircraft that cruise at Mach numbers higher than 2.0. Any inlet that accomplishes some of its compression internally is subject to an undesirable phenomenon known as inlet unstart. Inlet unstart is characterized by an expulsion of the inlet terminal shock from the desirable location at the inlet throat station to a position ahead of the inlet cowling with an associated large increase in drag and large thrust loss. Unstart may also affect the aerodynamics of the aircraft.

Sonic boom is another factor that must be taken into account in the design of inlets of supersonic aircraft. Since economically viable supersonic commercial aircraft must be able to operate supersonically over land, the inlet should contribute minimally to the sonic boom signature of the aircraft. Therefore, the technical challenge for the designer of inlets for modern commercial aircraft is to provide a high performance configuration that provides large operability margins (terminal shock stability to reduce the probability of inlet unstart), and to also identify a design that offers a reduction in the overall sonic boom signature of the aircraft. Mixed-compression inlets can efficiently decelerate the airflow while providing large operability margins. However, the external compression, which is provided by a centerbody or cowl surface, radiates shock waves outward that contribute to the aircraft's sonic boom signature. These designs also have leading edges that include an external surface at an angle to the local airflow. Oblique shock waves are generated by these surfaces, contributing to the aircraft's overall sonic boom problem. Over-land operation of commercial supersonic aircraft requires that the sonic boom signature from the aircraft be reduced to acceptable levels. In order to achieve the required acceptable boom levels, sonic boom contributions from each component on the aircraft must be reduced to the lowest possible level.

All-internal compression inlets are desirable from a sonic boom reduction standpoint, because they may be designed with no oblique shock waves generated by an external compression system that would contribute to sonic boom signature. However, attempts to design these inlets have been generally unsuccessful, primarily due to large amounts of bleed required for inlet starting and started operation. Since these designs typically utilized fixed geometry, large amounts of bleed were necessary to provide the effective flow area ratio from the inlet entrance to inlet throat to allow the inlet to start (establish a supersonic flow field from the inlet entrance to the inlet throat). Large amounts of bleed were also necessary during normal operation because these inlets did not incorporated a stability system. This trend is typical of inlets that do not incorporate a stability system. Adequate inlet stability margins for inlet operation prior to unstart can only be provided by the fixed geometry bleed systems by prohibitively bleeding large amounts of bleed airflow during normal operation. The development of a low sonic boom aircraft therefore requires an innovation in supersonic inlet design.

SUMMARY OF THE INVENTION

The inlets disclosed and claimed herein provide high performance, large operability margins, i.e. terminal shock stability that reduces the probability of inlet unstart, and contribute little or nothing to the overall sonic boom signature of the aircraft. The characteristics of these inlets include very high internal area contraction or compression and very low external surface angles. The design concept of this invention is a very high to all internal compression inlet, in which all shocks from the internal inlet surfaces are captured and reflected inside the inlet duct (no compression system shocks radiated external to the inlet duct). Additionally, they allow all of the external nacelle surfaces to be completely or very nearly aligned with the external flow (zero external surface angles). These low profile external surfaces do not produce a shock wave that contributes to the sonic boom problem. In this invention, an all-internal compression inlet is combined with a shock stability bleed system. The innovative application of a shock stability bleed system can prevent inlet unstarts caused by both internal and external flow disturbances, and provide large shock stability margins, thereby making the all internal-compression, or near all-internal compression inlets feasible for application to supersonic cruise vehicles.

The inlet shock stability system consists of bleed regions that duct bleed airflows to variable area exits. The stability system incorporates either passive or active exit area controls. This system prevents inlet unstarts by removing airflow through a large open throat bleed region to compensate for reductions in diffuser (engine) corrected airflow demand.

Because the stability bleed is not removed until the inlet terminal shock moves upstream over the bleed region, the necessary normal shock operability margin is provided without compromising inlet performance (total pressure recovery, and distortion) and without requiring prohibitive amounts of performance bleed during normal inlet operation. Research has demonstrated that the utilization of a variable bleed exit on a large open throat bleed region can provide very large inlet stability margins for both internal and external airflow variations. The appropriate placement of a stability bleed system in the throat of an all internal-compression inlet makes the design of such a configuration feasible.

This all internal-compression inlet concept is designed to provide the high performance and reliability required for a highly efficient supersonic aircraft and minimally contribute to sonic boom signature. The unique feature of the proposed design is the utilization of an all-internal compression scheme combined with a shock stability system. This type of inlet offers the opportunity to consider external surfaces that are substantially aligned with the approaching airflow that will not produce shock waves and the associated sonic boom. For inlets of this type, all of the supersonic compression is generated by the contouring on the internal surface of the cowl since they do not employ a centerbody.

Other features and advantages of this invention will be apparent to those skilled in the art after reading the following detailed description and the accompanying drawings.

DRAWINGS

FIG. 1 shows an isometric view of a low sonic boom all internal-compression inlet embodying this invention.

FIG. 2 presents a horizontal cross-sectional view of the inlet shown in FIG. 1, showing the internal cowl surfaces and an indication of the inlet aerodynamics.

FIG. 3 shows a downstream view of the inlet, i.e. in the direction of airflow through the inlet, rotated 90° from FIG. 1 for ease of comparison with FIG. 2.

FIG. 4 presents a vertical cross-sectional view of the inlet that shows the internal contours on the top and bottom surfaces of the inlet.

FIGS. 5 through 9A show cross-sectional views of the inlet.

FIGS. 10 through 10-D, 11 and 11-A present cross-sections of the inlet that show the cowl surfaces in the on-design (supersonic cruise) position and in the most off-design (low-speed) collapsed condition. The design position is presented in FIG. 10 and the off-design position is shown in FIG. 11. Stability bleed regions are also depicted in FIG. 10.

FIGS. 10E through 10H are the same cross-sectional views of the inlet as shown in FIG. 10–10D, with the addition of an exit control valve.

FIGS. 12 through 14 show a mechanical mechanism to provide variable geometry for a two dimensional (i.e. an inlet of rectangular cross-section in which the external surfaces from the leading edges to the inlet throat are composed of flat or contoured plates) supersonic cruise inlet utilizing all internal-compression.

Figure 16:
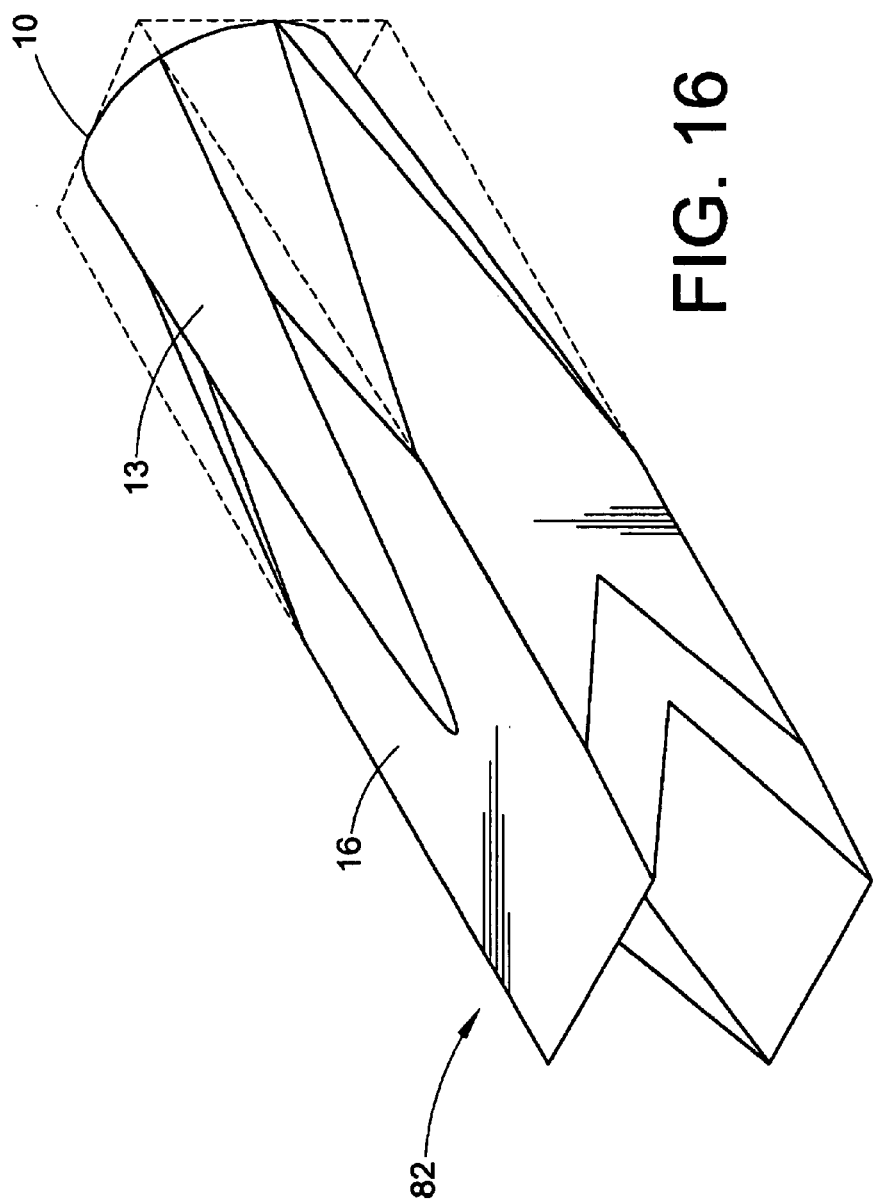
Figure 17:
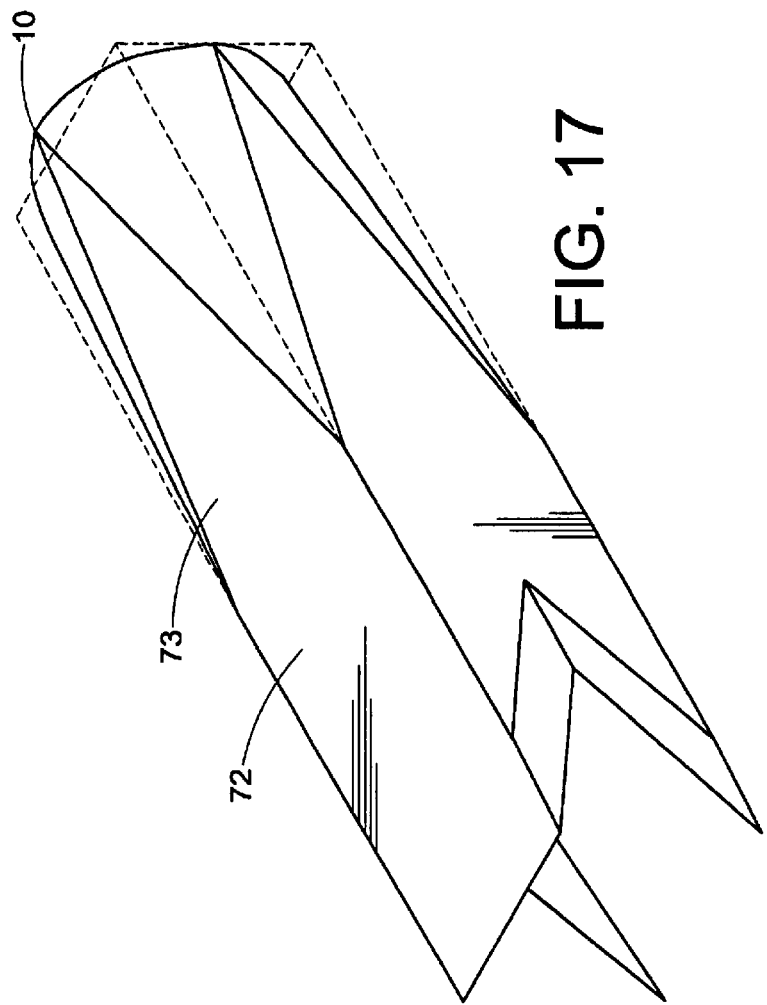
Figure 18:

FIGS. 16 through 18 present approaches to adjust the top and bottom sidewalls of an inlet that is sized to meet the airflow demand of an engine with a requirement for a very low entrance Mach number.

Figure 19:
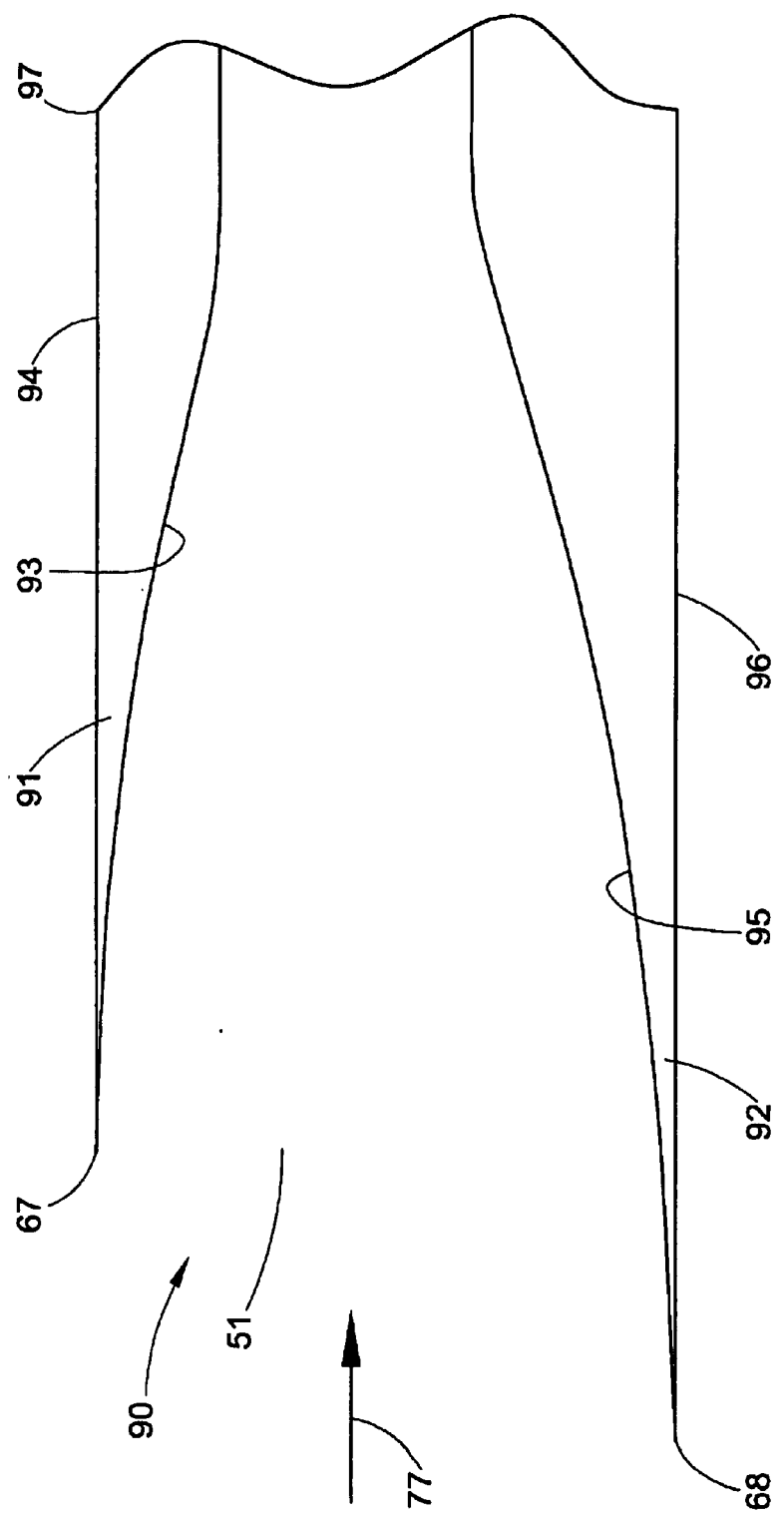

FIG. 19 presents a configuration similar to the inlet of FIG. 1 with the leading edges of the cowl staggered.

Figure 20:
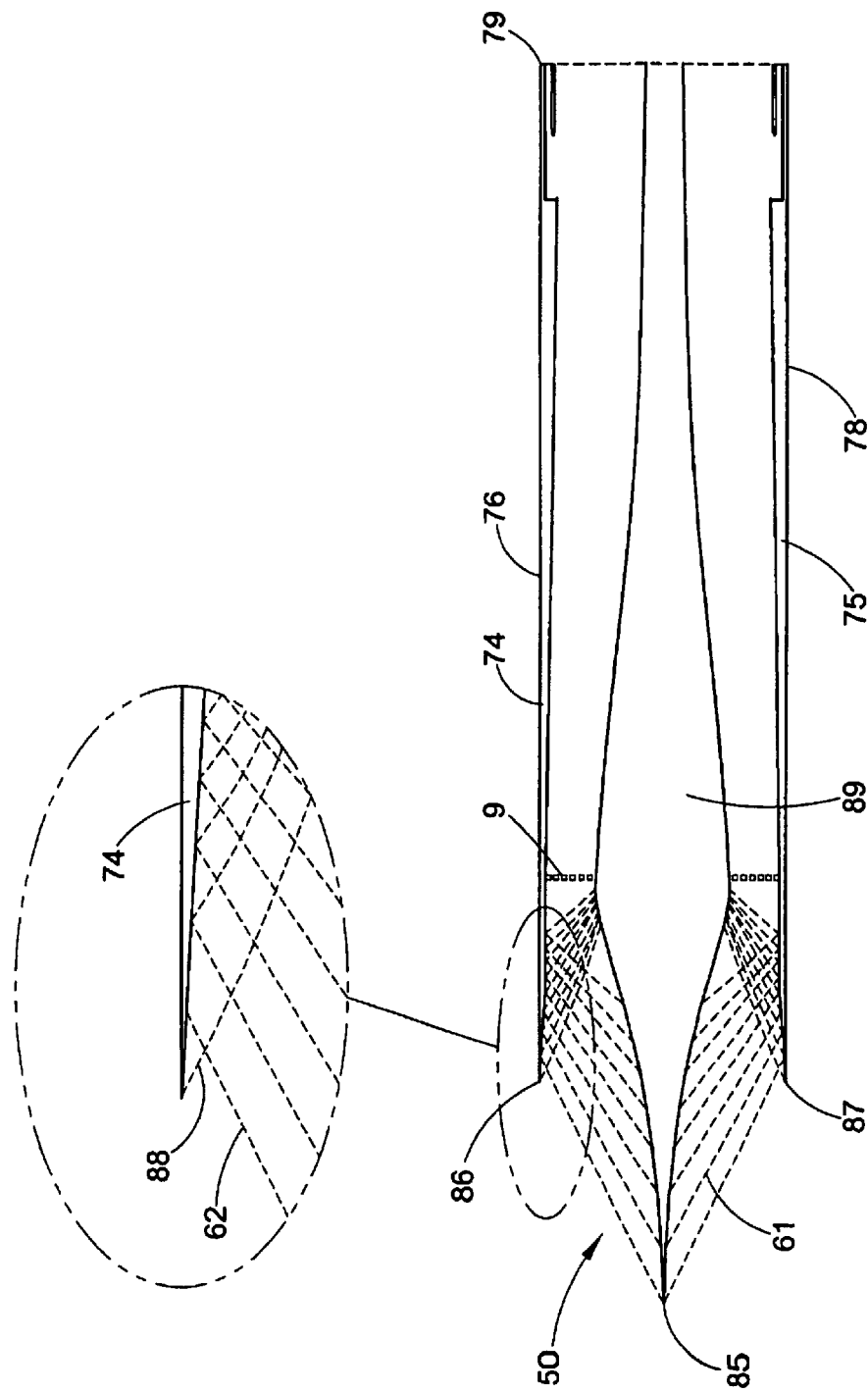

FIG. 20 presents an alternate bifurcated inlet configuration that utilizes the staggered concept of FIG. 19 in a back-to-back arrangement.

DETAILED DESCRIPTION

Figure 4:
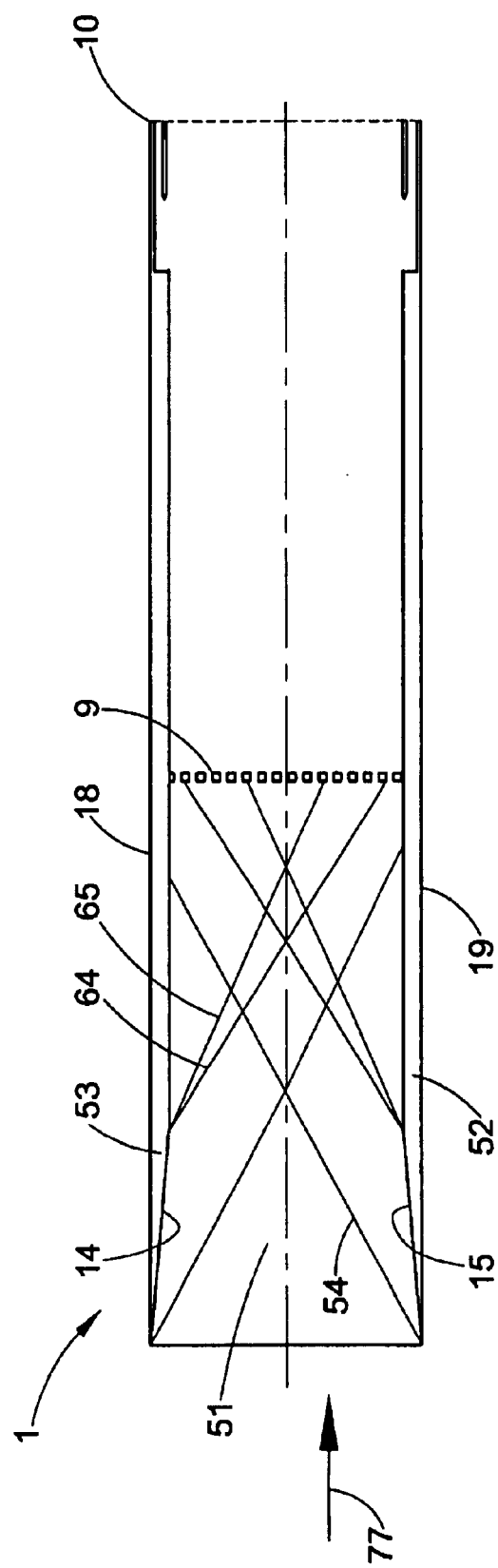

The basic inlet concept is presented in FIGS. 1 through 14. FIG. 1 shows an isometric view of the inlet, referred to generally as 1, and FIGS. 2 through 4 present cross-sections of the configuration. The isometric sketch in FIG. 1 depicts a supersonic inlet 1 in which all the external surfaces are flow-aligned, i.e aligned with the airflow approaching the inlet. The airflow approaching the inlet is substantially parallel to the inlet centerline; therefore, surfaces that are flow-aligned with the freestream airflow are also parallel to the inlet centerline. The initial external cross-sectional shape of the inlet is rectangular and then transitions as indicated by the surfaces 21 to a round nacelle at the downstream end 10. If the propulsion system uses a square or rectangular nozzle, transitioning of the inlet surfaces, as shown by surface 21 in FIG. 1, to a round nacelle is not required; therefore, the rectangular cross-section would be continued to the end of the nacelle, station 10. This inlet 1 is composed of four surfaces: the sidewalls 55 and 56 and top and bottom surfaces 53 and 52, respectively, of the inlet. As shown in FIG. 3 (rotated 90° relative to FIG. 1 for ease of comparison with FIG. 2), these surfaces (55, 56, 52 and 53) provide the internal channel 51 to duct the captured airflow 77 through the inlet to the exit station 10.

Referring to the horizontal cross-sectional view in FIG. 2, inlet 1 uses a low-angle (typically about 5° or less relative to the incoming airflow) initial compression wedge 3 on the internal cowl compression surface 2, which generates an initial oblique shock 4, i.e. a shock wave with an angle less than 90° to the surface that is radiated out from the leading edge of from any compression surface angle. For example, a 5° wedge in a Mach 2.4 airstream generates an oblique shock wave with a 28.73° angle to the incoming airflow. This internal cowl compression surface 2 includes the initial low angle wedge 3, an isentropic contour 5, a throat section 6 (minimum cross-sectional area), and a subsonic diffuser 7. Isentropic compression refers to a compression process that is generated by a continuous curvature of the compression surface in which the airflow is progressively compressed or decelerated with no loss in the total pressure of the airstream. Isentropic compression can be approximated by using a series of small angle changes to develop the overall required compression. The isentropic compression contour 5 provides the additional required supersonic compression or deceleration from the initial wedge 3 to the inlet throat section 6.

The isentropic compression flow field is depicted by the Mach waves 8. For example, in a typical supersonic transport installation, operating at supersonic design conditions of about Mach 2.4, the supersonic airflow will have decelerated to about Mach 1.3 when it reaches the throat 6. A normal (terminal) shock 9 at the inlet throat 6 will typically further decelerate the airflow to about Mach 0.8. The subsonic airflow downstream of the terminal shock 9 continues to decelerate in the subsonic diffuser 7 that extends from the inlet throat 6 to the diffuser exit station 10.

The internal inlet duct 51 is rectangular to a location just downstream of the inlet throat 6 and then transitions to a circular cross-section at a station just upstream of the engine location 10. Tangent lines 11 that are created by filleting the corners are shown. The subsonic diffuser contains a break in the contour that provides an opening 12 to a typical overboard bypass system (not shown). As indicated in the downstream view of the inlet presented in FIG. 3, the initial inlet external surfaces are 16, 17, 18, and 19. FIG. 2 shows that external surfaces 16 and 17 are at 0° (flow aligned).

A downstream view of the inlet configuration is presented in FIG. 3. The distance between the internal surfaces 14 and 15 is equal to the engine diameter 61. These internal surfaces are also shown in FIG. 4. The top wall 53 is composed of an inner wall 14 and an exterior surface 18. Surface 14 exhibits an initial small compression surface angle to the incoming airflow 77 that is captured by the inlet. This small internal angle is necessary because the external angle for surface 18 is about 0°. This small internal compression angle for surface 14 results in a weak shock wave 54. Proceeding downstream from the initial wedge, surface 14 then transitions to an axial direction with an expansion of the flow field. This expansion is represented by an initial expansion wave 64 and a final expansion wave 65. This internal compression—expansion created by surface 14 and by the identical opposite surface 15 should have very little effect on the overall inlet compression process. The airflow conditions approaching the inlet throat terminal shock 9 should mainly be the result of the compression system created by the cowl surface 2 as shown in FIG. 2.

Figure 5:
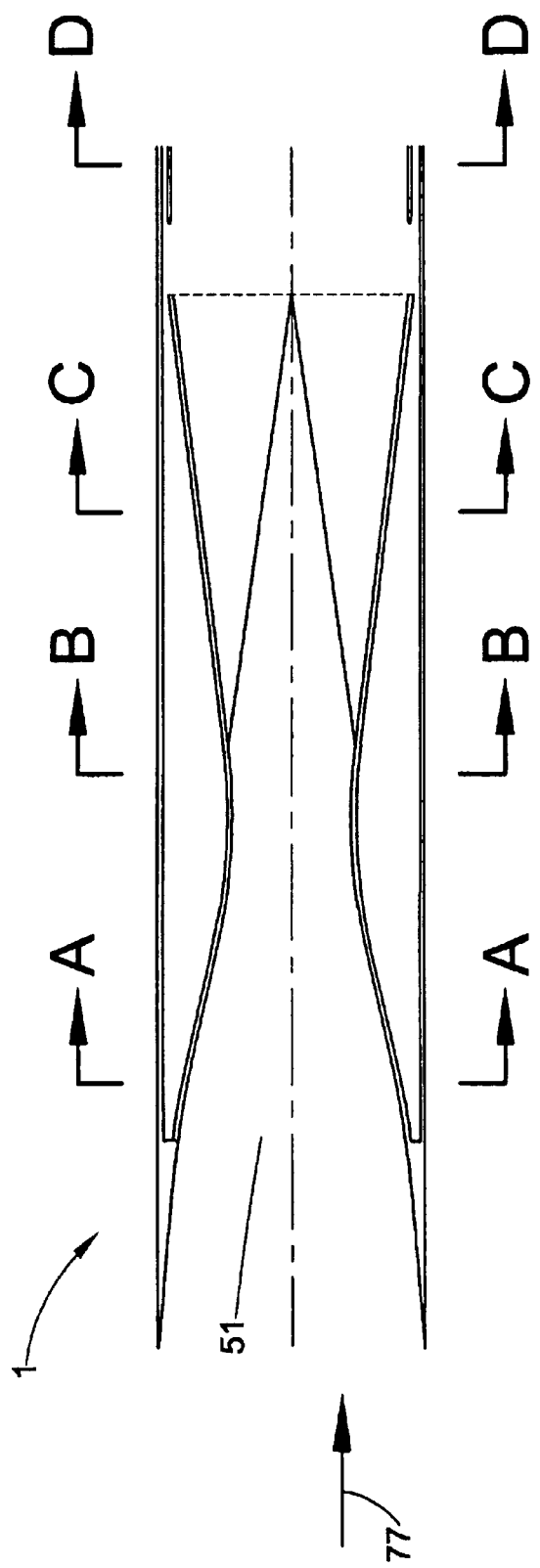

FIG. 5 shows the locations of several cross-sections (A—A to D—D) on the inlet 1. Cross-sectional views for these cross-sections are presented in FIGS. 6 through 9. Again as for FIG. 3, note that the cross-sections are rotated for ease of comparison with FIGS. 2 and 5. Cross-section A—A is shown in FIG. 6. In FIG. 6, both the internal duct (composed of surfaces 2, 14 and 15) and the external shape (composed of surfaces 16, 19, 17, and 18) are rectangular. The shape is similar for FIG. 7 (cross-section B—B, FIG. 5) except the distance between the cowl surfaces 2 show the restriction of the duct area in the throat (minimum area) of the inlet. FIG. 8 shows the transitioning of the inlet to circular, both internally and externally. The external surfaces are transitioned by the circular arcs 21, and the internal surfaces are transitioned by the circular arcs 20. FIG. 9 shows a cross-section near the exit of the inlet in which both internal and external contours are circular. FIG. 9A shows a cross-section near the exit of the inlet in which both internal and external contours are elliptical.

This inlet utilizes a significant amount of isentropic compression. The benefits of isentropic compression and a throat Mach number of about 1.3 will result in excellent total pressure recovery. In addition, the overall reduction in performance due to boundary layer will be lower for an all-internal compression inlet than for of a conventional mixed-compression inlet, since the basic inlet of this disclosure does not employ a centerbody. Inlets must provide a range of mass flows over which they can operate without the occurrence of an inlet unstart. Traditional performance boundary layer bleed systems can provide only a small operability margin. Since this margin is generally not sufficient, additional margin is provided by operating at reduced performance levels. A very high level of performance and an adequate operability margin to prevent inlet unstart can be realized through the utilization of a stability bleed system. This system allows operation of the inlet at the optimum performance condition, and yet provides significant shock stability margins under conditions where an inlet unstart might tend to occur, such as when the terminal shock moves upstream through the throat region of the inlet due to a transient reduction in engine airflow demand. The inlet stability bleed system compensates for changes in diffuser exit (engine) airflow demand by removing increasing amounts of airflow from the inlet as the terminal shock moves upstream over the open bleed regions that are located in the throat of the inlet. The stability system functions to provide the necessary stability margins to prevent inlet unstart without prohibitive amounts of bleed during normal inlet operation by using variable area exit control valves that limit the amount of bleed flow until increased bleed is required in response to the upstream movement of terminal shock resulting from a transient disturbance in inlet subsonic diffuser airflow.

An inlet throat stability bleed system is shown in FIGS. 10 through 10-D. Uniformly distributed porous bleed is the preferred method to remove bleed airflow; however, any type of bleed opening can be used. For the preferred configuration, porous bleed surfaces are located in the inlet throat section. Cowl bleed regions 23 are located in cowl section 29, and sidewall bleed regions 24 are located in sidewalls 14 and 15 (see FIGS. 10-B and 10-C). In the preferred embodiment, the open bleed regions 23 and 24 consist of the inlet surfaces with 0.125-inch holes drilled normal to the surface to obtain 40% open area (40% porosity). The bleed holes are located on 0.1875-inch centers with the holes in adjacent rows staggered to obtain a uniform distributed pattern. The preferred bleed surface would include a surface thickness to hole diameter ratio of 1.0. The sidewall bleed 24 extends beyond the design cowl position so that bleed can be removed during off-design operation. Folding compartment seals 44 are used to direct the inlet bleed from the bleed surfaces (23 or 24) to exit passages and variable-exit area controls, such as active or passive fast-acting valves (not shown) at the bleed plenum exit, which control the amount of bleed that is removed from the inlet.

FIGS. 10, 10-D, 11 and 11-A also illustrate one variable cowl geometry system that can provide the necessary variation of the internal surface geometry and well as changing the duct cross-sectional area at the inlet throat. Engine airflow demand varies as the flight vehicle speed changes from takeoff to supersonic cruise; therefore, a variation in the minimum duct area is necessary to accommodate the changes in airflow. For efficient inlet operation, the internal surface geometry must also be changed as the speed of the aircraft changes. This surface variation as the flight vehicle speed changes allows the most optimum compression of the airflow that enters the inlet system. The internal inlet duct must be opened to a large area as illustrated in FIG. 11 during takeoff and for low speed flight. As the flight vehicle accelerates to supersonic conditions, the variable geometry system is used to both provide the proper variation in inlet throat area as well as surface geometry. Comparison of the internal duct 51 geometry of FIGS. 11 and 10 shows the wide changes in the inlet geometry from takeoff to cruise speeds. Three hinge locations 25, 26, and 27 are shown in the Figures; however, the number of hinges may be any number suitable to provide proper cowl geometry at off-design conditions. The variable cowl consists of an upstream section 28 hinged (25) at the upstream station and connected to additional cowl sections 29 and 30 with hinges 26 and 27, with the downstream end of the last section 30 including a guide pin 31 in a groove 32 (detail) to allow the length change for off-design operation, FIG. 10. The track 32 for the guide pin 31 is aligned to properly position the downstream end of the last cowl section 30. All cowl sections are hinged to the first cowl section 28. A sketch of the cowl in the off-design position is presented in FIG. 11. Note the change in position of the downstream guide pin 31 between FIGS. 10 and 11.

Figure 14:
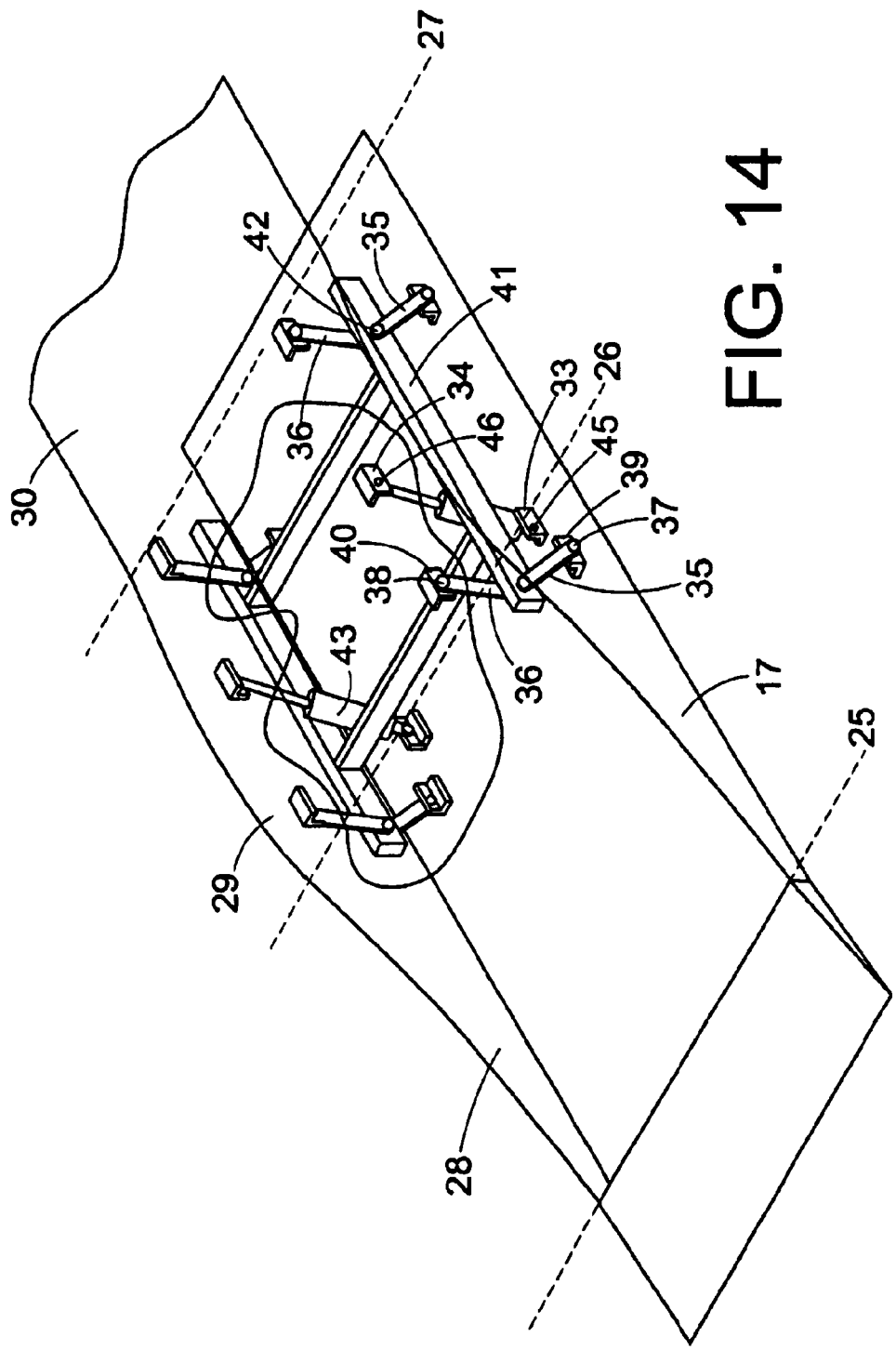

Additional details of this variable cowl geometry scheme are presented in FIGS. 12 through 14. Hydraulic actuators 43 are utilized to collapse the cowl surfaces for off-design operation. These cylinders 43 are pinned 45 to bracket 33 that is attached to the outside surface 16 or 17 at one end and pinned 46 at the other end to bracket 34 that is attached to cowl surface 29. The hydraulic cylinders are attached to a common fluid supply source so that uniform movement is obtained. Two actuators are shown in FIG. 14; however, any number could be used that would fit within the space available and effect the desired movement of the cowl surfaces. While the hydraulic actuators provide the actuating power, the actual movement of the second cowl section 29 is controlled by a scissors arrangement that provides parallel positioning of the section for any operating condition of the inlet. FIG. 12 shows that this scissors arrangement is comprised of link bars 35 and 36 that are pinned 37 and 38 to brackets 39 and 40 at the outer ends and pinned to frame 41 at pin 42. Frame 41 is also shown in the isometric sketch of FIG. 14. The off-design position of the cowl 29 is shown in FIG. 13. As indicated in a comparison of the cowl 29 vertical positions between FIGS. 12 and 13, the inlet throat surface can be actuated to provide a significant increase in duct area for off-design operation. The parallel throat sections 29 at design and off-design positions are shown in FIGS. 12 and 13.

Figure 15:
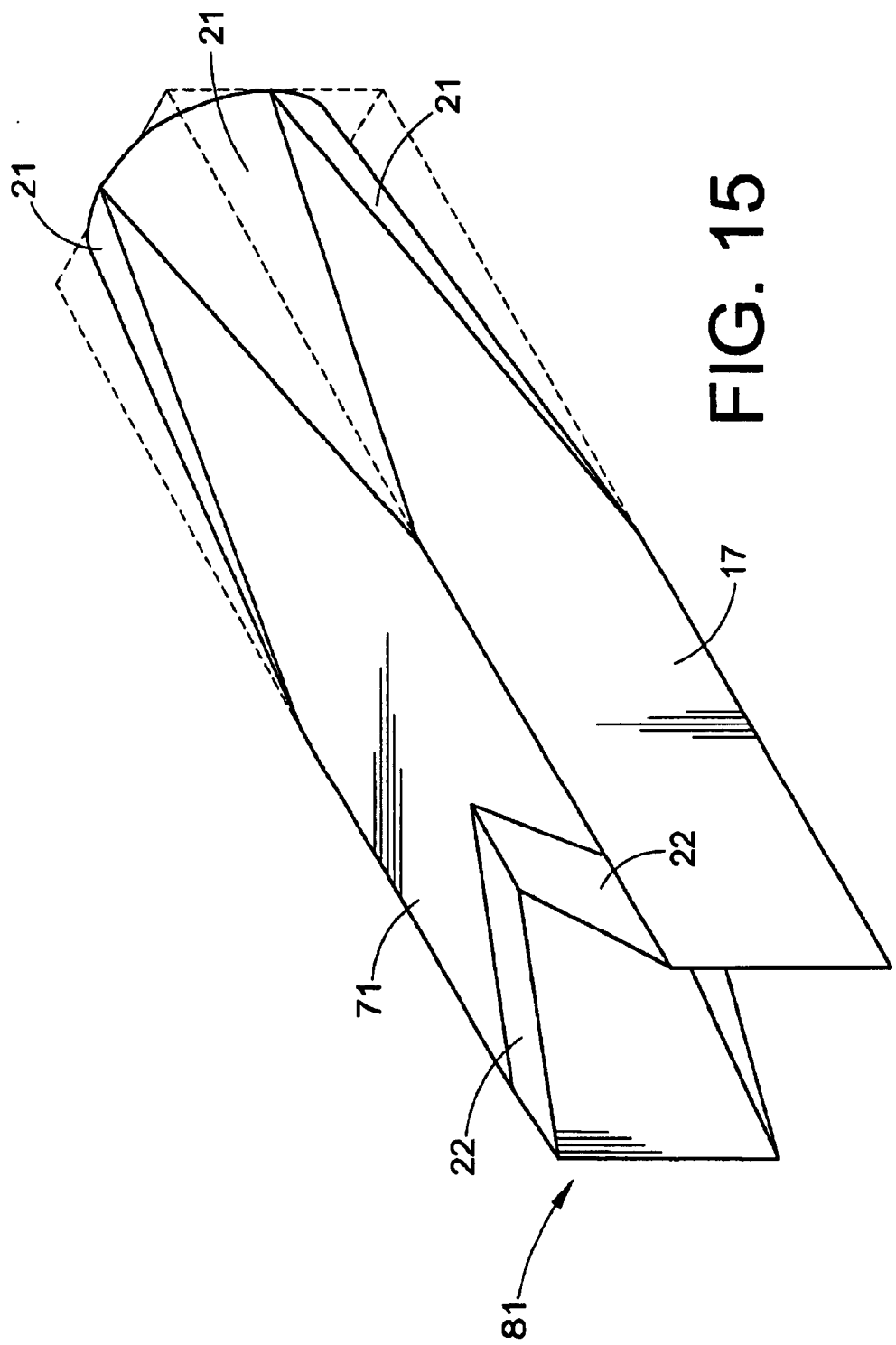
FIG. 15 shows an alternate leading edge for the top and bottom surfaces.

FIG. 1 shows an inlet with all external surfaces flow-aligned. However, this design requires the use of a small amount of compression on the wall of the inlet as shown in FIG. 4. Although small, as discussed for FIG. 4, this additional compression does result in some 3D flow in the inlet. The small internal compression wedges on the top and bottom inlet walls of the inlet generate a flow field that has a vertical crossflow component. This crossflow component in the vertical plane of the inlet interacts with the crossflow component that is generated by the compression surfaces in the horizontal plane. This interaction results in a 3D flowfield. This additional compression could be avoided if a configuration as presented in FIG. 15 is utilized. This design basically reverses the initial leading edge angle for the top and bottom walls from a wedge angle on the inside surface to an angled wedge 22 on the exterior surface 71. Therefore, the resulting internal surface is flat with no additional compression to create 3D flow effects. While the small angle on the exterior surface will generate a weak shock wave, it should not significantly contribute to the sonic boom signature. Thus, the inlet configuration 81 of FIG. 15 offers the significant advantages of the all-internal compression configuration with a small compromise in the external surface sonic boom contribution for optimum internal aerodynamics.

The basic design problem of providing low external surface angles for lower supersonic cruise Mach number inlets is that the ratio of inlet capture area to engine face area gets smaller as the inlet design Mach number decreases, particularly for inlets matched to jet engines that require low entrance Mach numbers. For the Mach 2.4 inlet design that is presented in FIGS. 1 through 14, sizing of the inlet capture area to supply airflow to the jet engine 61 at an entrance Mach number of about 0.4 provides an inlet 1 in which the angles of the external surfaces 16, 17, 18 and 19 are 0° relative to the approach airflow 77 as shown in FIG. 1 through 14. For this flow-aligned external-surface design, the external cross-sectional area of the inlet at the engine face station 10 was increased by an amount necessary to provide a sufficient annular airflow passage between the outside of a jet engine 61 and the outer nacelle 62 (FIG. 2) for cooling airflow around the exterior of the engine. The inlet of FIGS. 1 though 15 represent a design that has a minimum contribution to the sonic boom of a supersonic cruise aircraft.

If an engine is selected for a Mach 2.4 inlet that requires an entrance Mach number less than about 0.4, all of the external surfaces cannot be aligned with the approach airflow. For low Mach number at the entrance to the engine, the engine area relative to the inlet entrance area will be larger, and a slight external angle on the top 16 and bottom 17 surfaces will result. Two transition schemes for the additional bulge are shown in FIGS. 16 through 18. Since the largest cross-sectional area is at the inlet exit 10 (engine entrance), the largest bulge on the external surface will be at this location. To obtain a low boom design for this inlet/engine combination, the external surface of the inlet is transitioned to the larger engine face area over a large distance on the nacelle upstream of the bulge, allowing a very small external angle and minimizing the resulting shock strength. The transitioning may have a circular arc shape 13 as shown in FIG. 16. As shown in FIGS. 17 and 18, the transitioning to the larger engine may extend along the entire surface 72 as a curved flat surface 73 to the engine face 10. In FIG. 18, only the surface contour 73 is shown. In either case, the low angled contouring of the transitioning surface (13 or 73) would have little to no contribution to the sonic boom signature of the aircraft.

Several alternate configurations can be derived from the inlet design that is shown in FIGS. 1 through 18 without departing from the basic design approach to identify a very low boom inlet configuration. Two such inlet configurations are shown in FIGS. 19 and 20. A staggered inlet configuration 90 is presented in FIG. 19. Only the supersonic diffuser of the inlet, from the leading edges 67 and 68 to the inlet throat station 97, is shown in FIG. 19. The subsonic diffuser for this configuration would be similar to the one 7 shown in FIG. 2. This inlet 90 is basically identical to the inlet 1 of FIG. 1 except the leading edges 67 and 68 have been staggered to begin at different axial stations. This design offers the same performance and operability, would incorporate stability and variable geometry systems, and would have no external shock waves (no sonic boom) during operation at design conditions. Staggering of the leading edges offers some advantage for spilling airflow at off-design conditions. For the inlet 1 configuration of FIG. 2, in which the leading edges of the cowls 16, and 17 begin at the same axial position, airflow cannot be spilled around the cowling during off-design flight speed conditions until the inlet unstarts. Upon unstart, airflow can spill around the cowling after it passes through a strong normal or bow shock that is located ahead of the inlet. Spilling airflow behind a strong normal shock has higher drag than supersonic spillage (spilling behind a supersonic oblique shock). Staggering of cowl lips 67 and 68 of inlet 90 (FIG. 19) offers an unstarted inlet in which the normal shock is located ahead of lip 67 and an oblique shock is generated by lip 68. This oblique-normal shock combination offers more efficient spillage of the airflow due to the reduction of the velocity through the oblique shock prior to further deceleration through the normal shock.

An alternate inlet 50 developed by using the same design approach as for the inlets 1 and 90 of FIGS. 2 and 19 is shown in FIG. 20. The inlet 50 of FIG. 20 employs the staggered leading edge inlet design of FIG. 19 in a back-to-back arrangement to create a bifurcated configuration with a variable geometry centerbody and flow aligned external surfaces 76 and 78. Inlet 50 of FIG. 20 is derived by placing surfaces 96 of two inlet 90 from FIG. 19 together in such a way that a back-to-back bifurcated inlet configuration is obtained. The internal duct rectangular cross-section at the throat of each of these inlets would be transitioned to a semi-circle at the exit 79 of the inlet to jointly form a round entrance for a single engine. The large amount of staggering of the leading edges, leading edge 85 to 86 and leading edge 85 to 87, for this configuration would provide nearly the same off-design spillage characteristics as a more conventional mixed-compression inlet design. This inlet design 50 has all shock waves 62 and 88 internal to the duct and all external surfaces 76 and 78 of cowls 74 and 75 are flow aligned; therefore, this design, unlike conventional designs, will not contribute to the sonic boom signature of the aircraft at design operating conditions.

The inlets defined in FIGS. 1 through 20 represent a new approach to inlet design. This invention offers inlet design options that can lead to new, more efficient, safer, and more environmentally friendly aircraft. This inlet concept may offer integration options that were not possible with more traditional inlets. This design approach can provide an inlet configuration that will provide enabling technology for a quiet (low sonic boom), efficient, supersonic cruise aircraft.

While 2-dimensional inlet configurations have been described in FIGS. 1 through 20, it will be evident to those skilled in the art that the concept may be extended to the design of axisymmetric inlets with similar attributes and benefits.

It is understood that the invention is not limited to the specific embodiments herein illustrated and described, but may be used in other ways without departing from its spirit. Other embodiments of the internal compression inlet described herein that suggest themselves to those skilled in the art are intended to be covered by the claims of this disclosure which are as follows:

We claim:

1. A supersonic inlet for use with an aircraft, said supersonic inlet comprising:
    an internal duct having an opening for receiving airflow and a throat section, said inlet further comprising one or more external surfaces wherein said one or more entire external surfaces are aligned with the flow of the aircraft, said opening of said internal duct further comprised of a first and second leading edge, wherein said leading edges are staggered in location; and
    said throat section of the inlet further incorporating a shock stability bleed system, wherein a portion of said airflow is removed from said internal duct so that a shock wave is maintained within said throat section.

2. A supersonic inlet for use with an aircraft, said supersonic inlet comprising:
    an internal duct having an opening for receiving airflow and a throat section, said inlet having one or more external surfaces aligned with the airflow of said aircraft, a centerbody positioned within said duct, and having a leading edge, the external surfaces being aligned with the airflow of the aircraft from the leading edge to an associated engine;
    said opening of said internal duct further comprised of a leading edge, wherein said leading edge of said duct is staggered in location with respect to the leading edge of the centerbody; and
    said throat section of the inlet further includes a shock stability bleed system, wherein a portion of said airflow is removed from said internal duct so that a shock wave i maintained within said throat section.

3. The inlet of claim 1 wherein all of the external surfaces are aligned with the airflow of the aircraft.

4. The inlet of claim 1 wherein one or more of the external surfaces are aligned with the airflow of the aircraft at all operating conditions.

5. The inlet of claim 1 wherein said internal duct comprises one or more movable compression surfaces.

6. The inlet of claim 1 wherein said one or more external compression surfaces are fixed in location.

7. The inlet of claim 2 wherein all of the external surfaces are aligned with the airflow of the aircraft.

8. The inlet of claim 2 wherein one or more of the external surfaces are aligned with the airflow of the aircraft at all operating conditions.

9. The inlet of claim 2 wherein said internal duct comprises one or more movable compression surfaces.

10. The inlet of claim 2 wherein said one or more external compression surfaces are fixed in location.

11. A low boom supersonic inlet for use with an aircraft engine, the supersonic inlet comprising:
    one or more internal surfaces forming an internal duct to provide airflow to the aircraft engine and having an opening for receiving airflow; and
    one or more external surfaces that are entirely aligned with the flow of air to the inlet whereby the inlet external shock waves that contribute to the sonic boom signature of the aircraft have been substantially reduced.

12. The low sonic boom supersonic inlet of claim 11 wherein said internal surfaces provide supersonic compression and are movable into two or more positions.

13. The low sonic boom supersonic inlet of claim 11 wherein said internal surfaces extend from the leading edge to the engine entrance, said internal surfaces comprising one or more compression surfaces for providing supersonic compression of the air to the inlet throat and subsonic diffusion of the air to the engine entrance.

14. The low sonic boom supersonic inlet of claim 11 wherein said internal duct further comprises a throat section having a shock stability bleed system comprised of one or more bleed passageways wherein a portion of said airflow is removed from said internal duct through said one or more bleed passageways so that an airflow shock wave is maintained within said throat region.

15. The low sonic boom supersonic inlet of claim 11 wherein all of the compression surfaces are located within said internal duct.

16. The low sonic boom supersonic inlet of claim 15 wherein excess air not required by the engine is ducted out of the inlet through an overboard bypass system.

17. The low sonic boom supersonic inlet of claim 11 wherein said internal duct has a rectangular cross-sectional shape.

18. The low sonic boom supersonic inlet of claim 11 wherein said internal duct has a elliptical cross-sectional shape.

19. The low sonic boom supersonic inlet of claim 1 wherein said internal duct has a rectangular cross-sectional shape.

20. The low sonic boom supersonic inlet of claim 1 wherein said internal duct has a elliptical cross-sectional shape.

21. The low sonic boom supersonic inlet of claim 2 wherein said internal duct has a rectangular cross-sectional shape.

22. The low sonic boom supersonic inlet of claim 2 wherein said internal duct has a elliptical cross-sectional shape.

23. The low sonic boom supersonic inlet of claim 1 wherein said shock stability bleed system further comprises bleed passages having a variable area exit.

24. The low sonic boom supersonic inlet of claim 1 wherein said throat section of said inlet further comprises one or more movable internal sidewalls in the throat section for varying the throat area.

25. The low sonic boom supersonic inlet of claim 1 wherein the interior surfaces of the internal duct have continuous surfaces from the opening to the exit of the inlet.

* * * * *